United States Patent
Hofmann

(10) Patent No.: US 7,152,876 B2
(45) Date of Patent: Dec. 26, 2006

(54) GAS BAG FOR A SIDE IMPACT PROTECTION DEVICE

(75) Inventor: Sven Hofmann, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 354 days.

(21) Appl. No.: 10/754,755

(22) Filed: Jan. 9, 2004

(65) Prior Publication Data

US 2004/0150199 A1 Aug. 5, 2004

(30) Foreign Application Priority Data

Jan. 31, 2003 (DE) ................. 103 03 901

(51) Int. Cl.
*B60R 21/16* (2006.01)

(52) U.S. Cl. ................... 280/743.1; 280/743.2

(58) Field of Classification Search ............ 280/730.2, 280/729, 743.1, 743.2
See application file for complete search history.

(56) References Cited

U.S. PATENT DOCUMENTS

| | | | | |
|---|---|---|---|---|
| 5,586,782 A | * | 12/1996 | Zimmerman et al. | 280/730.2 |
| 5,593,179 A | * | 1/1997 | Maruyama | 280/740 |
| 5,718,450 A | * | 2/1998 | Hurford et al. | 280/730.2 |
| 5,746,447 A | * | 5/1998 | Dyer et al. | 280/743.2 |
| 6,019,122 A | * | 2/2000 | Chen | 137/223 |
| 6,170,513 B1 | * | 1/2001 | Lo | 137/223 |
| 6,349,964 B1 | | 2/2002 | Acker et al. | |
| 6,402,190 B1 | * | 6/2002 | Heudorfer et al. | 280/729 |
| 6,616,177 B1 | * | 9/2003 | Thomas et al. | 280/729 |
| 6,976,702 B1 | * | 12/2005 | Yokota et al. | 280/730.2 |
| 6,991,257 B1 | * | 1/2006 | Zhao et al. | 280/730.2 |
| 2005/0173898 A1 | * | 8/2005 | Yoshikawa et al. | 280/729 |
| 2005/0206138 A1 | * | 9/2005 | Breuninger et al. | 280/729 |
| 2005/0248132 A1 | * | 11/2005 | Wheelwright | 280/729 |

FOREIGN PATENT DOCUMENTS

| | | |
|---|---|---|
| DE | 10020920 | 10/2001 |
| EP | 1026048 | 1/2000 |
| EP | 1008494 | 6/2000 |

* cited by examiner

*Primary Examiner*—Paul N. Dickson
*Assistant Examiner*—Toan C. To
(74) *Attorney, Agent, or Firm*—Tarolli, Sundheim, Covell & Tummino LLP

(57) ABSTRACT

A gas bag for a side impact protection device includes at least two inflatable chambers (28, 30) separated from each other in a gas-tight manner. The gas bag (10) is formed from two covering layers (12, 14) lying one over the other, which define an inflatable region and an inflation opening (16) of the gas bag (10), and from a fabric layer (18) arranged between the two covering layers (12, 14). The fabric layer (18) has an outer edge which in the inflatable region of the gas bag (10) is connected only with one of the two covering layers (12, 14) to divide the gas bag (10) into the two chambers (28, 30).

8 Claims, 2 Drawing Sheets

GAS BAG FOR A SIDE IMPACT PROTECTION DEVICE

TECHNICAL FIELD

The invention relates to a gas bag for a side impact protection device.

BACKGROUND OF THE INVENTION

A known gas bag for side impact protection has at least two inflatable chambers which are separated from each other in a gas-tight manner.

A gas bag module with such a gas bag for the protection of the pelvic and chest areas of a vehicle occupant is known from the EP-A-1 008 494. The two chambers of the gas bag, which are separated from each other by a seam, are filled with gas from a compressed gas source with a distributor housing such that the lower chamber, provided for protection of the pelvic area of the vehicle occupant, has a higher internal pressure than the upper chamber provided for the protection of the chest area of the vehicle occupant. With such a gas bag, however, care must be taken that the separating seam is not stressed too highly by the hot inflowing gas on inflation of the gas bag, and that the partial reduction of the thickness of the gas bag, necessitated by the separating seam, leads to a reduced protective effect in this region and as a whole leads to a reduction in the inherent rigidity of the gas bag compared with a corresponding gas bag without separating seam.

In the DE-A-100 20 920 there is shown a side impact protection device with a double gas bag. Inside a first gas bag for protection of the chest area of a vehicle occupant, a separate second gas bag is arranged for protection of the pelvic area of the vehicle occupant, which is inflated with a higher pressure than the first gas bag. This design requires a very costly production process, because the second gas bag has to be introduced through an opening of the first gas bag and subsequently sewn to it. The connection of the two gas bags can only take place in the external, i.e. visible area. A disadvantage with respect to the installation space is the at least four-layered structure in the region of the second gas bag, which requires a large storage space to house the double gas bag. Owing to the gas bag lying in the interior, in this region also no precisely defined folding (turning over etc.) is possible. In addition, the position of the gas generator arranged in the seat rest and provided for filling the gas bags, is subject to great restrictions owing to the special construction. Moving the installation position of the gas generator, owing to limited space conditions (if, for example, an arrangement for moving a lordosis support is additionally provided in the seat rest), is only possible with a high constructional expenditure in this system.

The invention provides a gas bag which is constructed in a compact manner, can be designed so as to be flexible and makes possible a simple realization of various pressure zones, adapted to the biomechanical characteristics of the parts of vehicle occupant's body, to protect the vehicle occupant in a side impact.

BRIEF SUMMARY OF THE INVENTION

According to the invention, a gas bag for a side impact protection device includes at least two inflatable chambers separated from each other in a gas-tight manner. The gas bag is formed from two covering layers lying one over the other, which define an inflatable region and an inflation opening of the gas bag, and from a fabric layer arranged between the two covering layers. The fabric layer has an outer edge which in the inflatable region of the gas bag is connected only with one of the two covering layers to divide the gas bag into the two chambers. The proposed dividing of the gas bag into two chambers by means of the fabric piece has the advantage that a constriction of the gas bag is avoided, because no separating seam connecting the two covering layers is provided for the formation of the chambers. This leads to a high stability of the gas bag, in particular in the longitudinal direction of the vehicle, which is very important for a rapid positioning of the gas bag. The gas bag proposed can be adapted to various requirements, because by corresponding deformation and placing of the fabric layer, various pressure levels can be realized in freely selectable regions of the gas bag. The number of layers lying one over the other amounts to a maximum of three in the gas bag according to the invention. Therefore, no special characteristics have to be taken into account in the folding of the gas bag, because the fabric layer lying between the covering layers does not essentially affect the folding. Despite the high functionality, the weight and structural space of the gas bag are reduced to a minimum by the simple construction. The gas bag according to the invention can also be adapted without any problem to the position of the compressed gas source, which can be established on the overall circumference of the gas bag, preferably in longitudinal direction of the gas bag. The function of the gas bag is therefore independent of the position of the gas bag module.

Preferably, the fabric layer has two flaps in the region of the inflation opening, one of the flaps being connected with one of the covering layers for the formation of an inflow opening for one of the chambers, and the other flap being connected with the other covering layer for the formation of an inflow opening for the other chamber. Thus, an inflation opening can be realized for the gas bag, via which both chambers can be filled separately.

DETAILED DESCRIPTION OF THE PREFERRED EMBODIMENTS

Figure 1:
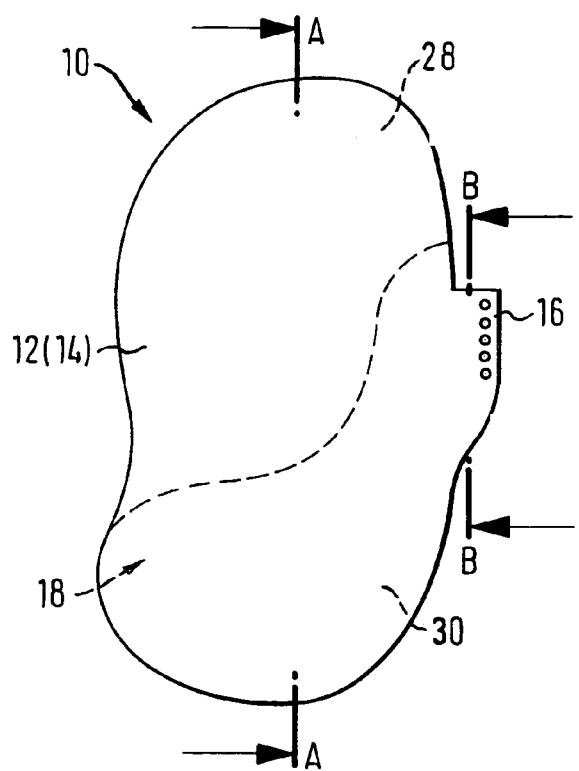
FIG. 1 shows a side view of a gas bag according to the invention.

The gas bag 10 illustrated in FIG. 1 is a component of a gas bag module of a side impact protection device for a vehicle occupant, housed for example in a seat or in a door lining of a vehicle. The gas bag 10 is filled by means of a compressed gas source (not shown) and unfolds between the vehicle occupant and the door lining.

Figure 2:
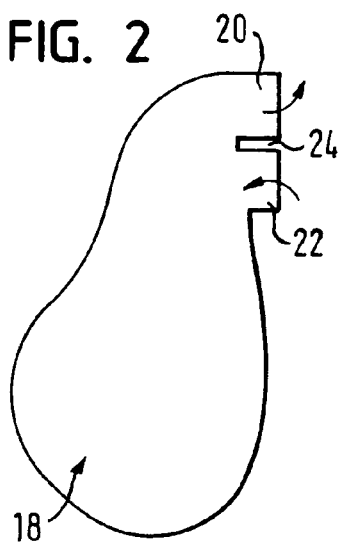
FIG. 2 shows a side view of the fabric layer of the gas bag of FIG. 1.
Figure 3:
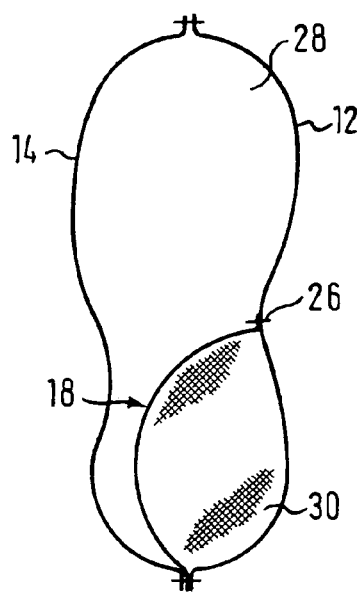
FIG. 3 shows a sectional view along line A—A in FIG. 1 according to a first variant embodiment.
Figure 4:
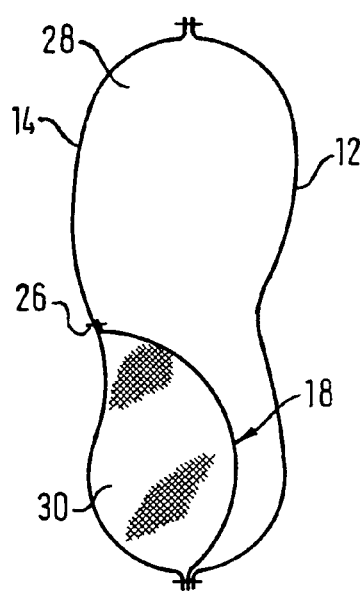
FIG. 4 shows a sectional view along line A—A in FIG. 1 according to a second variant embodiment.

The gas bag 10 is formed from two congruent covering layers 12, 14, of which only the covering layer 12 facing the occupant is to be seen in FIG. 1. The gas bag 10 has an inflation opening 16 which is described later in further detail. Between the two covering layers 12, 14 an additional fabric layer 18 is arranged, which is illustrated separately in FIG. 2. The fabric layer 18, the contour of which coincides in particular in the lower region with that of the covering layers 12, 14, has in the region of the inflation opening an upper flap 20 and a lower flap 22, which are separated from each other by a slot 24. With the exception of one of the two flaps, the fabric layer 18 is connected along its outer edge only with one of the covering layers, namely either with the covering layer 12 facing the vehicle occupant (FIG. 3) or alternatively with the covering layer 14 facing the door lining (FIG. 4). The connection between the covering layer and the fabric layer 18 in the variant embodiments shown is formed by a seam 26 in each case.

The gas bag 10 is divided by the fabric layer 18 into two chambers 28, 30 which are separated from each other in a gas-tight manner. For simplicity, in the following, the smaller chamber formed in the lower region of the gas bag 10 is designated as pelvic chamber 30 and the remaining chamber is designated as chest chamber 28, although a lower part of the chest chamber 28 moves over the pelvic chamber 30 and this part together with the pelvic chamber 30 contributes to the protection of the pelvic region or the abdomen of the vehicle occupant. The two chambers 28, 30 are accordingly not separated from each other by a constriction, as a simple separation seam would bring about. In the inflated state, the gas bag 10 therefore has across its entire height a minimum thickness and inherent rigidity necessary for the protective effect which is aimed for.

Figure 5:
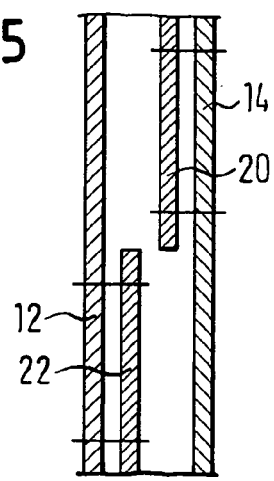
FIG. 5 shows a sectional view along line B—B in FIG. 1 according to a first variant embodiment.
Figure 6:
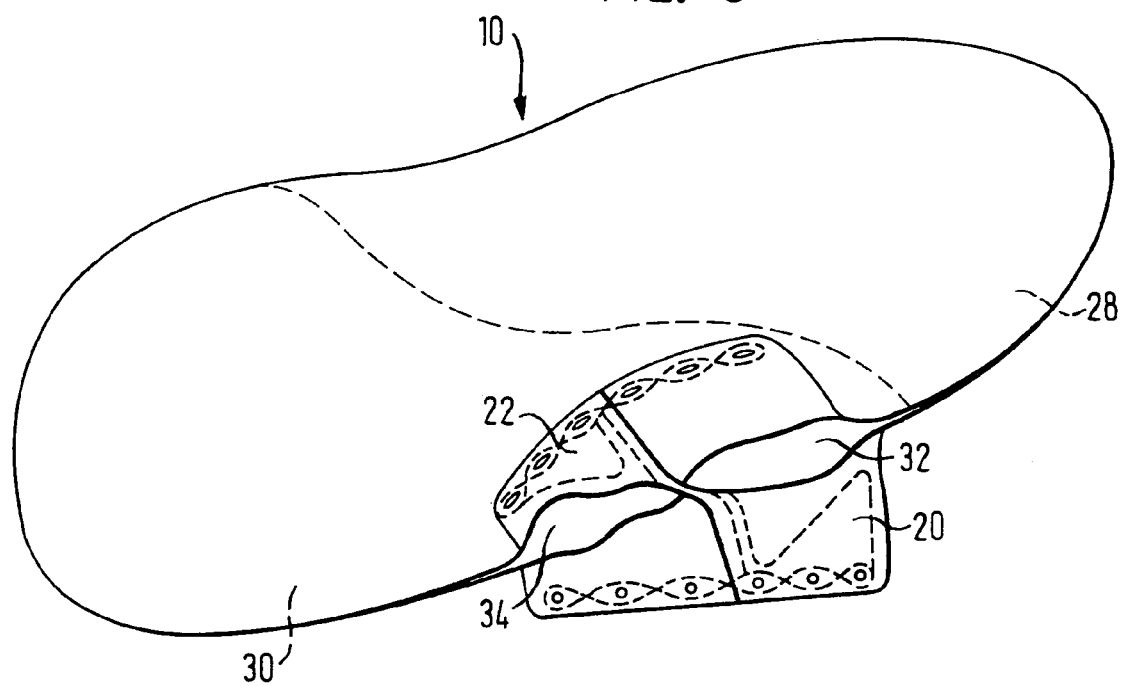
FIG. 6 shows a perspective view of the gas bag of FIG. 1.

The construction of the inflation opening 16 of the gas bag 10 can be seen from FIGS. 5 and 6. As indicated by the arrows in FIG. 2, the flaps 20, 22 of the fabric layer 18 are folded over in the production of the gas bag in opposite directions towards a covering layer 12 and 14, respectively, and then are sewn to it. In this way, a first inflow opening 32 is produced for the chest chamber 28 and a second inflow opening 34 for the pelvic chamber 30, the inflow openings 32, 34 being approximately equal in size.

If the gas bag 10 is filled with gas via the inflation opening 16, a higher pressure occurs in the smaller pelvic chamber 30 than in the chest chamber 28. Owing to the particular construction of the inflation opening 16, the gas bag 10 can be constructed so as to be very tight, so that also high pressure differences can be realized.

The invention was described by way of example with the aid of a gas bag 10 for protection of the pelvic and chest regions of a vehicle occupant, but is not restricted to the construction illustrated in the figures. Within the scope of the invention, generally gas bags with differently arranged pressure zones can be realized, e.g. gas bags with soft inner chambers which are surrounded by ring-shaped hard outer chambers.

The invention claimed is:

1. A gas bag for a side impact protection device, said gas bag comprising at least two inflatable chambers (28, 30) separated from each other in a gas-tight manner, said gas bag (10) being formed from two covering layers (12, 14) lying one over the other, which define an inflatable region and an inflation opening (16) of said gas bag (10), and from a fabric layer (18) arranged between said two covering layers (12, 14), said fabric layer (18) having an outer edge defining the entire periphery of said fabric layer (18) except for a region (24) forming an inflow opening (32), said outer edge being connected only with one of said two covering layers (12, 14) to divide said gas bag (10) into said two chambers (28, 30).

2. The gas bag according to claim 1, wherein said fabric layer (18) is connected with said covering layer (12; 14) by a seam (26).

3. A gas bag for a side impact protection device, said gas bag comprising at least two inflatable chambers (28, 30) separated from each other in a gas-tight manner, said gas bag (10) being formed from two covering layers (12, 14) lying one over the other, which define an inflatable region and an inflation opening (16) of said gas bag (10), and from a fabric layer (18) arranged between said two covering layers (12, 14), said fabric layer (18) having an outer edge which in said inflatable region of said gas bag (10) is connected only with one of said two covering layers (12, 14) to divide said gas bag (10) into said two chambers (28, 30), wherein said fabric layer (18) has two flaps (20, 22) in a region of said inflation opening (16), one of said flaps (20) being connected with one of said covering layers (14) for the formation of a first inflow opening (32) for one of said chambers (28), and the other flap (22) being connected with the other one of said covering layers (12) for the formation of a second inflow opening (34) for the other one of said chambers (30).

4. The gas bag according to claim 3, wherein said two flaps (20, 22) are separated from each other by a slit (24).

5. The gas bag according to claim 3, wherein said inflow openings (32, 34) are approximately equal in size.

6. A gas bag for a side impact protection device, said gas bag comprising at least two inflatable chambers (28, 30) separated from each other in a gas-tight manner, said gas bag (10) being formed from two covering layers (12, 14) lying one over the other, which define an inflatable region and an inflation opening (16) of said gas bag (10), and from a fabric layer (18) arranged between said two covering layers (12, 14), said fabric layer (18) having an outer edge which in said inflatable region of said gas bag (10) is connected only with one of said two covering layers (12, 14) to divide said gas bag (10) into said two chambers (28, 30), wherein at least a portion of the outer edge of said fabric layer (18) is located outside of said inflatable region of said gas bag.

7. The gas bag according to claim 6, wherein said portion of the outer edge of said fabric layer (18) is attached between said covering layers (12, 14).

8. A gas bag for a side impact protection device, said gas bag comprising at least two inflatable chambers (28, 30) separated from each other in a gas-tight manner, said gas bag (10) being formed from two covering layers (12, 14) lying one over the other, which define an inflatable region and an inflation opening (16) of said gas bag (10), and from a fabric layer (18) arranged between said two covering layers (12, 14), said fabric layer (18) having an outer edge which in said inflatable region of said gas bag (10) is connected only with one of said two covering layers (12, 14) to divide said gas bag (10) into said two chambers (28, 30), wherein at most three layers are positioned one over the other in the gas bag.

\* \* \* \* \*